(12) United States Patent
Thomas et al.

(10) Patent No.: US 10,869,076 B2
(45) Date of Patent: Dec. 15, 2020

(54) ACCESS TO CONTENT

(71) Applicant: PIKSEL, INC., Willmington, DE (US)

(72) Inventors: Gary Thomas, London (GB); Jonathan Steel, Somerset (GB); Greig Hilton, Epsom (GB); Ralf Tillmann, Mannheim (DE); Philip Shaw, York (GB); Hans-Jurgen Maas, Mainz (DE)

(73) Assignee: PIKSEL, INC., New York, NY (US)

( * ) Notice: Subject to any disclaimer, the term of this patent is extended or adjusted under 35 U.S.C. 154(b) by 112 days.

(21) Appl. No.: 15/559,231

(22) PCT Filed: Mar. 17, 2016

(86) PCT No.: PCT/EP2016/055886
§ 371 (c)(1),
(2) Date: Sep. 18, 2017

(87) PCT Pub. No.: WO2016/146785
PCT Pub. Date: Sep. 22, 2016

(65) Prior Publication Data
US 2018/0098106 A1    Apr. 5, 2018

Related U.S. Application Data

(60) Provisional application No. 62/289,731, filed on Feb. 1, 2016.

(30) Foreign Application Priority Data

Mar. 17, 2015  (GB) .................................. 1504492.8

(51) Int. Cl.
*H04N 21/262*  (2011.01)
*G06Q 20/12*  (2012.01)
(Continued)

(52) U.S. Cl.
CPC ......... *H04N 21/262* (2013.01); *G06Q 20/123* (2013.01); *G06Q 20/127* (2013.01);
(Continued)

(58) Field of Classification Search
CPC .. H04N 21/262; H04N 21/8545; G06Q 30/02; G06Q 30/06; G06Q 30/0251;
(Continued)

(56) References Cited

U.S. PATENT DOCUMENTS 9,648,088 B1 * 5/2017 Pande ................ G06Q 30/0631
2001/0037360 A1   11/2001 Ekkel
(Continued)

FOREIGN PATENT DOCUMENTS

EP      1 209 928 A2    5/2002
EP      1 517 505 A2    3/2005
(Continued)

OTHER PUBLICATIONS

International Search and Written Opinion, dated Apr. 25, 2016, European Patent Office.
(Continued)

*Primary Examiner* — John A Follansbee
*Assistant Examiner* — James N Fiorillo
(74) *Attorney, Agent, or Firm* — Holzer Patel Drennan

(57) ABSTRACT

The invention relates to a method of establishing access to content based on a future condition comprising providing an identifier at a user device; accessing a catalogue of available content based on the identifier; selecting at least one content identifier from the catalogue; and selectively enabling content associated with the content identifier in dependence a future condition. Reserving multimedia content such as video for a journey or flight and during the flight or journey the selected content is streamed to the user's mobile device.

14 Claims, 8 Drawing Sheets

(51) Int. Cl.
*G06Q 30/06* (2012.01)
*G06Q 30/02* (2012.01)
*H04L 29/08* (2006.01)

(52) U.S. Cl.
CPC ......... *G06Q 30/02* (2013.01); *G06Q 30/0251* (2013.01); *G06Q 30/06* (2013.01); *G06Q 30/0601* (2013.01); *G06Q 30/0645* (2013.01); *H04L 67/12* (2013.01)

(58) Field of Classification Search
CPC ........... G06Q 30/0601; G06Q 30/0645; G06Q 20/123; G06Q 20/127; H04L 67/12
USPC .................................. 709/203, 204, 219, 228
See application file for complete search history.

(56) References Cited

U.S. PATENT DOCUMENTS

| | | |
|---|---|---|
| 2002/0138625 A1 | 9/2002 | Bruner |
| 2002/0178451 A1 | 11/2002 | Ficco |
| 2004/0003400 A1* | 1/2004 | Carney .................. H04N 7/165 725/42 |
| 2008/0195664 A1* | 8/2008 | Maharajh .............. H04L 67/306 |
| 2008/0263681 A1* | 10/2008 | Dooms .............. G06Q 30/0601 726/33 |
| 2010/0169910 A1* | 7/2010 | Collins ............ H04N 21/25891 725/14 |
| 2011/0219407 A1 | 9/2011 | Paul |
| 2012/0173356 A1* | 7/2012 | Fan .................... G06Q 30/0601 705/26.1 |
| 2013/0166369 A1* | 6/2013 | Scipioni ............. G06Q 30/0238 705/14.27 |
| 2013/0232189 A1* | 9/2013 | Lewis .................... G06Q 30/02 709/203 |
| 2014/0245393 A1 | 8/2014 | Worrall et al. |
| 2014/0281559 A1* | 9/2014 | Trachtenberg ..... H04N 21/2347 713/178 |
| 2014/0351096 A1* | 11/2014 | Radziwon .......... G06Q 30/0645 705/26.81 |
| 2015/0074003 A1* | 3/2015 | Tickner .............. G06Q 30/0645 705/307 |
| 2015/0358790 A1* | 12/2015 | Nasserbakht ........... G06F 21/32 455/414.1 |
| 2016/0127334 A1* | 5/2016 | Bangole .................. H04L 67/12 713/171 |
| 2016/0150009 A1* | 5/2016 | LeRoy ................... G06Q 10/10 709/206 |
| 2017/0201850 A1* | 7/2017 | Raleigh ................. G06F 3/0482 |
| 2018/0115597 A1* | 4/2018 | Gillette ................... H04L 67/04 |

FOREIGN PATENT DOCUMENTS

| | | |
|---|---|---|
| EP | 2 811 747 A1 | 12/2014 |
| JP | 2013137595 A | 11/2013 |
| WO | 02/37246 A2 | 5/2002 |
| WO | 03/021909 A1 | 3/2003 |

OTHER PUBLICATIONS

Application No. 2,924,196, Office Action 1, dated Jul. 21, 2016, Canadian Intellectual Property Office.
Application No. 2,924,196, Office Action 2, dated Nov. 18, 2016, Canadian Intellectual Property Office.
Apple Premieres iTunes Movie Rentals With All Major Film Studios, Apple Press Info, Press Release, Jul. 28, 2016, https://www.apple.com/ca/pr/library/2008/01/15Apple-Premieres-iTunes-Movie-Rentals- . . . Jul. 28, 2016.
"Examination Report issued in European Patent Application 16 710 436.3-1222," dated Sep. 20, 2018.

* cited by examiner

ACCESS TO CONTENT

BACKGROUND TO THE INVENTION

Field of the Invention

The present invention is concerned with the provision of temporary access to reserved digital content. The temporary access may be for a predetermined period of time.

Description of the Related Art

It is known in the art to provide digital content, and it is known in the art for access to digital content to be reserved, such that access is allowed based on time of access and based on payment for access.

It is an aim to provide an improved technique for access to reserved digital content.

SUMMARY OF THE INVENTION

The invention enables digital content which is available in an online environment to be consumed by a user when the user is in an offline environment. Examples of environments where a user may be in an offline environment may be when a user is travelling and for examples on a flight, on a ferry etc. Other examples where a user may be in an offline environment are when a user is in a hospital, in a holiday park etc.

While the invention is particularly concerned with a user being in an offline environment, the invention also applies where an environment provides minimal connection for a user, or particularly provides a connection for a user such that online content cannot be reliably accessed.

In an aspect the invention provides a method of establishing access to content based on a future condition comprising: providing an identifier at a user device; accessing a catalogue of available content based on the identifier; selecting at least one content identifier from the catalogue; and selectively enabling content associated with the content identifier in dependence on a future condition.

The step of providing the identifier may comprise providing the identifier to an application of a user device. The step of selectively enabling content may comprise enabling the content at the user device. The step of selectively enabling content may comprise enabling the content at a further user device.

The step of selecting may comprise selecting a plurality of content identifiers. The step of providing the identifier may comprise providing the identifier at a user device and the step of selectively enabling content may comprise enabling content associated with at least one content identifier at the user device and enabling content associated with at least one further content identifier at a further user device.

The method may further comprise after the selecting step, downloading content associated with the selected content identifier to the user device.

The step of selectively enabling content associated with the content identifier may comprise downloading the content in dependence on the future condition being met.

The user device and/or the further user device may be connected to a network for downloading content when the future condition is met. The content may be stored on a memory connected to the network. The network may be a closed network, not connected to the Internet. The network may be a WiFi network.

The method may further include receiving a notification in addition to the future condition being met. The notification may be received via a beacon transmission. The notification may be received on a network to which the user device and/or the further user device is connected. The network may be a closed network, not connected to the Internet. The network may be a WiFi network.

The future condition may comprise a rights condition for the content, wherein the step of selectively enabling comprises matching the rights condition to a current condition. The rights condition may be a time window.

The current condition may be a current condition of the user device and/or the further user device. The current condition may be determined from a state of the user device and/or the further user device.

The current condition may be determined from one or more of the altitude or speed of the user device and/or the further user device.

The current condition may be notified to the user device and/or the further user device.

At the time of the future condition, connection to a content streaming service may be restricted. Said connection is provided via the Internet.

The future condition may be associated with a controlled environment. The future condition may be associated with a controlled journey.

The method may further comprise the step of accessing a connectivity map of a controlled journey, wherein the controlled journey is the identifier.

The content may be associated with restrictions and the identifier is associated with restrictions, the catalogue being presented based on a comparison of these restrictions.

The identifier may be a booking reference.

The identifier may be associated with multiple segments, at least one content identifier being selected for each segment.

The identifier may include a flight booking reference.

The method may further comprise downloading an application to provide the identifier to which application controls access to the content.

The application may be downloaded to the user device.

The step of accessing the catalogue may comprise transmitting the identifier from the user device to a server, and transmitting identifiers of available content from the server to the user device.

The step of selecting may comprise transmitting a content identifier selected from the list of content to a server associated with the content.

Downloading may comprise downloading the selected content from a server.

The future condition may be a condition which will occur after the content is downloaded to the user device.

The identifier may be associated with a time window having a start time and an end time, the future condition being that the current time coincides with the time window.

The content may be video content, and the steps of selectively enabling comprises selectively allowing access to playout the video content.

The step of selectively enabling may comprise allowing rights permitted access to the content.

In an aspect the invention provides a user device for establishing access to content comprising: a user interface for receiving an identifier provided by a user; a network interface for transmitting a request for a catalogue of available content based on the identifier and for receiving the catalogue of available content; and a display for displaying the catalogue of available content to the user; wherein a selection of at least one content identifier from the displayed catalogue of available content is received at the user interface, and an identification of the at least one content identifier is transmitted via the network interface.

The user device may be configured to receive a download of the content associated with the selected content identifier via the network interface. The user device may be further configured to transfer downloaded content to one or more further user devices.

A further user device may be configured to receive a download of the content associated with the selected content identifier via a network interface of the further user device.

The user device may be configured to selectively enable the downloaded content in dependence on a future condition being met.

The further user device may be configured to selectively download content in dependence on a future condition being met.

The downloaded content may be enabled in dependence on a future condition being met.

The identifier may include a flight booking reference.

The identifier may be associated with a time window having a start time and an end time, the future condition being a time.

The user device may enable the downloaded content when the current time coincides with the time window.

The content may be video content.

The user device may be configured to selectively enable content associated with the content identifier, wherein the content is associated with rights conditions, and enabling the content is on determination that the rights conditions are met. The content may be video content and in dependence on the rights conditions being met the video content can be watched.

In dependence on the rights conditions being met the content may be downloaded.

In dependence on the rights conditions being met the downloaded content may be enabled for access.

The rights condition may correspond to a rights permission.

In an aspect the invention provides a method of delivering content to a user device comprising: receiving a request for a catalogue of content, including an identifier; transmitting a catalogue of content identifiers based on the identifier; receiving a request for content from the catalogue; transmitting the content, including permissions associated with the content.

The permissions may include a condition to be met in order for the content to be enabled.

Enabling the content may comprise permitting playout of the content.

The permissions may define a time window.

In an aspect the invention provides a server for providing content and having a network interface, the server being configured to: receive a request for a catalogue of content, which request includes an identifier; transmit, in response thereto, a catalogue of content identifiers based on the identifier; receive a request for content associated with a content identifier of the catalogue; and transmit the content, including permissions associated with the content.

In an aspect there is provided a method of delivering content for time restricted playout at a user device, the method comprising: receiving at a computing apparatus a request for content from the user device; receiving by a processor of the computing apparatus (i) beginning time data and end time data of a playout window for content, and (ii) permitted use windows for multiple pieces of content; the processor executing matching code to compare the playout window with the permitted use windows and to generate a list of pieces of content for which the playout window is within the permitted use window; transmitting over a communication interface from the computing apparatus to the user device a message comprising the list of pieces of content for display at the user device; receiving from the user device a selection of one or more of the pieces of content; marking each piece of selected content for playout only in the playout window; and delivering the marked pieces of content to the user device.

The term 'playout' is generic to all types of digital assets. In general the term refers to the access of a digital asset. Thus playout simply refers to asset access.

Content refers to any digital form of material which may be books, audio content, video content, games etc.

In an aspect there is provided a method of delivering content for time restricted playout at a user device, the method comprising: creating a temporary access account for accessing content from a content provider, the temporary access account associated with a user device and a playout window playing out the content; receiving at a computing apparatus a request for content from the user device; receiving by a processor of the computing apparatus beginning time data and end time data of the playout window for content; the processor generating a list of pieces of content for consuming in the playout window; transmitting over a communication interface from the computing apparatus to the user device a message comprising the list for display of the pieces of content at the user device; receiving from the user device a selection of one or more of the pieces of content; without alerting a user of the user device, using the temporary access account to access the content provider to retrieve the selected pieces of content; marking each piece of content for playout only in the playout window; and delivering the marked piece of content to the user device.

The temporary account is preferably associated with identity information provided by a user of the user device. In an example scenario the identity information provided by a user may be PNR (passenger name record) and/or a user name. In this scenario the playout window may be associated with a flight.

In an aspect there is provided a method of delivering content for restricted playout at a user device, the method comprising: receiving at a computing apparatus a request for content from the user device; receiving by a processor of the computing apparatus (i) permitted use for a playout window for content, and (ii) multiple pieces of content; the processor generating a list of pieces of content for consuming in the playout window; transmitting over a communication interface from the computing apparatus to the user device a message comprising the list of pieces of content for display at the user device; receiving from the user device a selection of one or more of the pieces of content; marking each piece of selected content for playout only in the playout window; and delivering the marked pieces of content to the user device; and enabling the pieces of content in dependence on a predetermined condition being met.

The content choices may be made on one device and delivered to another. For example, a user may make content selections at one location using a particular device. Thereafter the user may be able to access the content selections they made on a further device which is provided at a different location, with the further device being a generally provided device rather than a user specific device, although it is specific to the user for the period if use by the user and therefore is a user device for that duration.

An example of this is where a user is a hospital patient. The patient may access content whilst at home to create the content that will be accessible offline during a hospital stay. During the hospital stay the patient is then able to access the content on, for example, a smart television.

Another example is where the user may access content at home to create content that will be available during a journey. The content is then accessed off line during the journey. The content may be accessed by the user during the journey, for example, on a screen provided on the back of a seat, such as in an aircraft.

In these two examples the content is provided on a general display which is user specific for the duration of the determined period. When selecting the content at home, the user does so using an appropriate reference which identifies the selection of the content being associated with the general display, so that the chosen content can be made available at the display at the appropriate time.

BRIEF DESCRIPTION OF THE FIGURES

The invention is described by way of reference to the accompanying drawings in which.

DESCRIPTION OF THE PREFERRED EMBODIMENTS

The invention is now described with reference to examples, which are non-limiting.

The present invention is concerned with the scenario in which a user wishes to consume content at a later point in time. Content for the later point in time is determined based on future events. The content is rights-restricted, and is available for a future point in time in dependence on the associated rights allowing permissible access to the content at the later point in time. A future condition associated with a later point in time is used to enable content, and the content which is enabled has been selected on the basis that its rights permit its access at the later point in time.

The access to the content is dependent on matching a state of a device to rights to access content.

The invention is concerned with consuming content at a later point in time on the basis that connectivity to allow streaming of the content at the later point in time will not be available. This may be for example because no Internet connection or other network connection to allow streaming will be available at a later point in time, or because it is expected that any network or Internet connection which will be available at a later point in time will not reliably allow streaming. For example, on a travel journey such as a journey by car, it is possible that any network connectivity will be intermittent during the journey, such that no reliable connectivity is available during the journey.

In some scenarios consumption of content at a later point in time may be subject to the provision of content being restricted to a certain condition. The condition may be for example that the content can only be consumed on a flight. An airline may therefore offer content for consumption which is rights restricted so it can only be consumed on a flight.

The future condition is in general an event, which may be associated with a time window or may be associated with a particular occurrence. For example the future event may be a time window having a start time and a finish time. The future event may be the receipt by a device of a particular signal or command. A future event may be the detection by the device of a particular condition, for example the device moving at a particular speed or being at a particular altitude.

Figure 1:
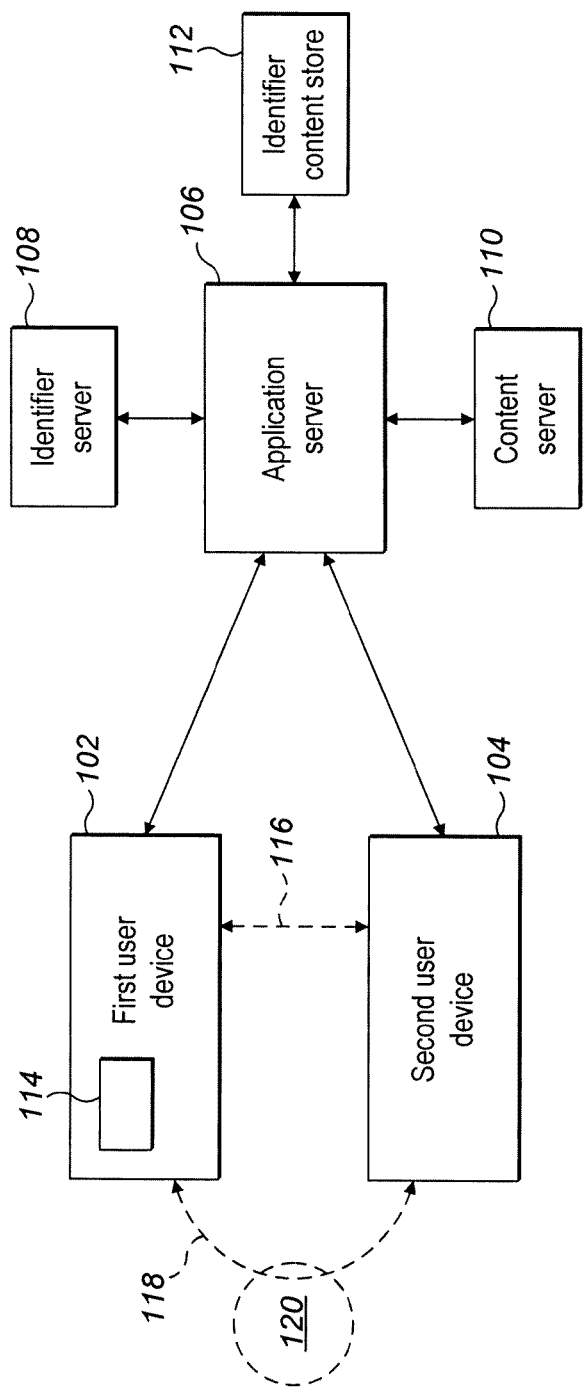
FIG. 1 illustrates an exemplary architecture.

With reference to FIG. 1 there is illustrated for the purposes of example the architecture of a scenario in which embodiments of the present invention may be implemented. There is shown in FIG. 1 a first user device 102, a second user device 104, an application server 106, an identifier server 108, a content server 110, and an identifier content store 112. The first and second user devices 102 and 104 are connected to the application server 106 via a network such as the Internet. The application server 106 is connected to each of the identifier server 108, the content server 110, and the identifier content store 112.

A user associated with the first user device 102 may download an application (APP) associated with the application server 106, which then runs on the first user device. The user associated with a first user device 102 is then able to access this application.

The user may input an identifier at the application on the first user device 102. This identifier may or may not specifically identify the user. This identifier is preferably a unique identifier.

The application running on the first user device 102 then transmits a request for a catalogue of available content, this request also including the entered identifier. This request is transmitted from the first user device 102 to the application server 106.

The application server 106 receives the request, and uses the identifier to access the identifier server 108. Based on the identifier the application server 106 is able to retrieve from the identifier server 108 information associated with the identifier and linked to a future condition. For example there may be a time window associated with the identifier, or there may be a particular characteristic such as speed or altitude of the user device associated with the identifier.

There may be a plurality of pieces of information associated with the identifier and retrievable from the identifier server 108, with each piece of information being referred to as a segment.

Based on the information retrieved from the identifier server 108, the application server 106 accesses the content server 110, to retrieve the identity of content associated with the identifier. For example when the identifier defines a time window, the content server 110 will deliver content to the application server 106 which is permitted for access within that time window. If the identifier is associated with a condition such as speed, then the content server 110 delivers an identity of content which is permissible for a speed threshold. The identifier may be associated with multiple conditions, and therefore an identity of content may be returned from the content server 110 which is associated with multiple conditions.

Following this, the application server 106 has a list of content from a catalogue available content which has been selected in dependence on the identifier provided by the user device. The application server 106 then returns that list to the first user device 102, and the first user device 102 can display that list on a display 114 thereof.

The user of the first user device 102 can then select one or more content items from the displayed list of items, and any item selected is notified to the application server 106 by a communication from the first user device 102. The application server 106 is then able to identify one or more content selections made by the user of the first user device 102.

The application server 106 can then access the identified content store 112 to store the content selection together with the identifier, or to create some further unique identifier with which the content is stored. Where a unique identifier is created, then this unique identifier may be notified by the application server 106 to the first user device 102, so that it can be displayed to the user.

In one example, when the application server 106 receives notification of selection of a content item, then the application server 106 may retrieve the actual content associated with this selection from the content server 110, and then deliver (download) the content to the first user device 102. When this occurs, no information may be stored in the identifier content store 112. However alternatively, or in addition thereto, the identity of the content may be stored in the identifier content store 112.

Where the content is downloaded to the first user device 102, then when a future condition is identified, access to the content is triggered on the first user device.

In alternatives the unique identifier entered by the user at the first user device 102 may be entered by the user at any user device, and wherever the identifier is used content then downloaded to that user device, or content identified and associated with the identifier, and stored in the identifier content store 112.

For example, a user may use the first user device 102 and provide a particular unique identifier, access the application, and download one or more items of content to the first user device.

The same user may also use the second user device 104 and enter the same unique identifier at the application also downloaded and running on second user device 104, and any content selected may be downloaded to the second user device.

In such a scenario the content is downloaded to the user device which is used for the selection following the provision of the identifier, and then is accessible from that user device.

Arrangements of the application may allow for a predetermined number of items of content to be downloaded, for example three items of content. When the user uses the first device 102 to download one item of content using a unique identifier, then when they use the same unique identifier with the second user device 104 only two items of content are available to be downloaded, since one of the maximum of three items has already been downloaded.

As noted above embodiments to the invention allow for content to be downloaded specifically to a user device for access on detection of a future condition. In alternative arrangements an item of content downloaded to one user device may be transferred from the user device to another user device, utilising the application. When the item of content is transferred, for example from the first user device to the second user device, it is deleted from the first user device when it is copied onto the second user device, such that it is only available on one user device. Communication between user devices in this way may be directly from device-to-device, or via a network. The dash line 116 denotes communication directly between user devices, and the dash line 118 denotes communication between the user devices via a network 120.

In arrangements the selected content may not be downloaded to the user device, but may only be downloaded to a user device when the future condition is met. The communication between the first and second user devices 102 and 104 to the application server 106 may be provided by a network such as a Wi-Fi network, rather than the public Internet. In dependence on a future condition being met, the content may be downloaded from the application server 106 to one of the user devices 102 or 104 when the future condition is met.

The use of one or more user devices 102 in order to select content based on the identifier and permissions of the content may be performed, and then the appropriate information stored in the identifier content store 112. This may be achieved whilst the user device is connected to the application server via the Internet. At a later date, the user device may be connected to the application server (possibly a different application server, but a server running the same application) via a Wi-Fi network, and this application server has access to the same information as in the identifier content store 112, and the content server 110. When the future condition is met, with such Wi-Fi connection established, the content is downloaded by the application server from the content server to the user device.

In general the invention enables online digital content to be consumed when a user is in an offline environment, or in an environment where a reliable online connection is not provided.

In general, the invention applies to any scenario in which there is a reservation period associated with a user. An example of this is a travel journey, where the reservation period is the journey.

In general, the invention applies to any device which may be connected to a central computing device which provides digital content. A described example relates to a user device such as a smartphone device or tablet device.

The invention provides for the provision of digital content to a user device for a reservation period. In the example where the reservation period is a travel journey, this provides digital content to a user of the user device for the duration of the travel journey.

The provision of digital content for a reservation period is facilitated by the provision of an APP on a user device. An APP is well-known in the art, and is a self-contained program or piece of software designed to fulfil a particular purpose, typically downloaded by a user to a mobile device.

The APP enables the user to access content for the reservation period. The content is in general digital content which is accessible through the user device. The content may be any form of digital content, such as digital books/magazines, audio content or video content.

The APP communicates with an application server in order to access the content for the reservation period. The APP allows the user to select content which is provided by the application server. After selection the content is stored on the user device, and is accessed by the user. The content is available by the user device for a period of time associated with the reservation period.

The user may download the APP to the user device in the usual way. The APP may be a free APP or may be a paid for APP. Once installed, the user runs the APP on their user device in the usual way.

A reservation period for a user will define a period which has a start time and an end time for the user. A reservation period for a user may have multiple segments, with each segment having its own start time and end time. The start time and end time define the permissions for that segment of the reservation period. The permissions may be defined in some other way than by start time and end time.

The invention is further described with reference to three example scenarios. Before describing each, an exemplary architecture suitable for each scenario is shown in FIG. 2.

Figure 2:
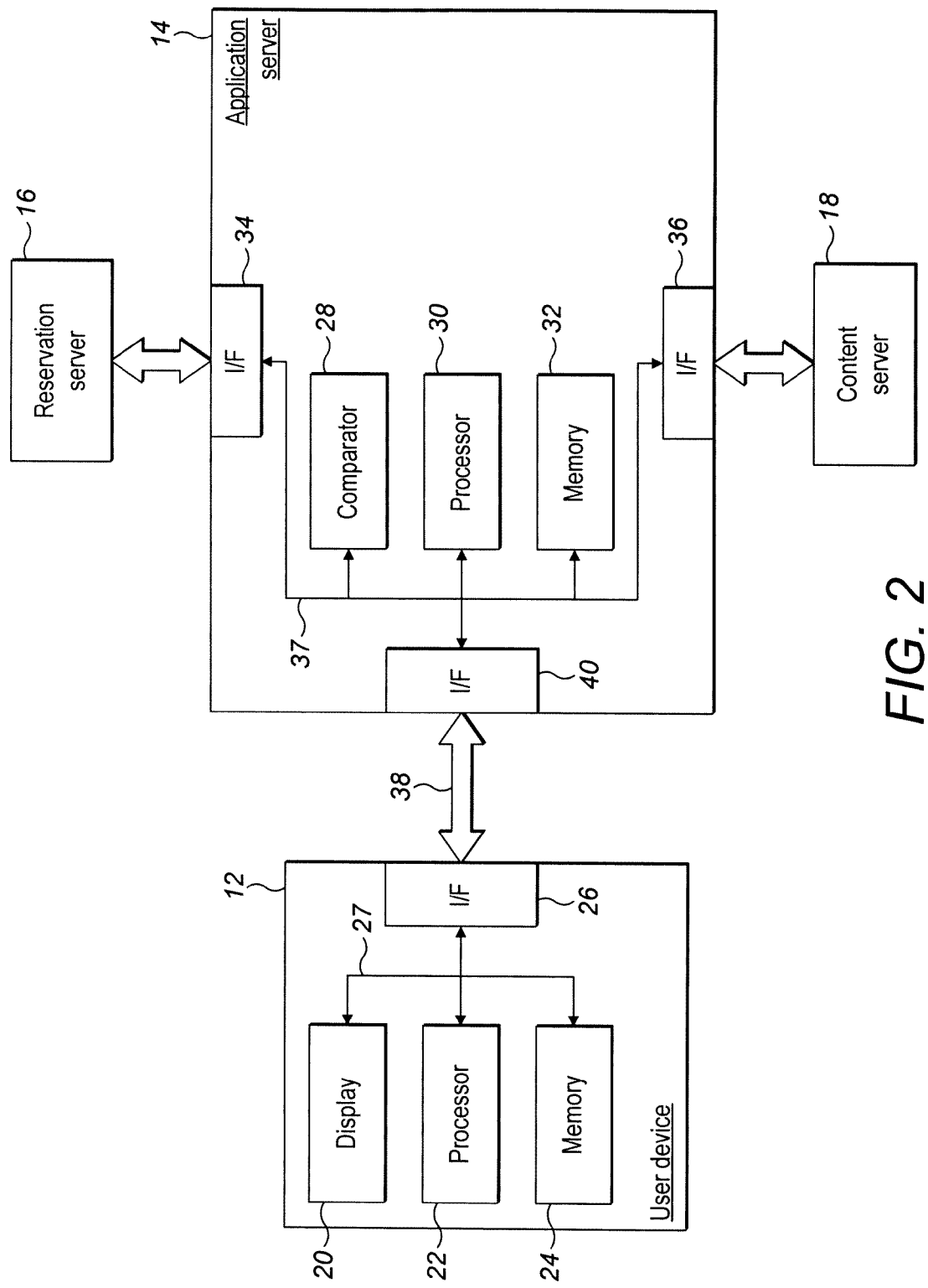
FIG. 2 illustrates an exemplary architecture in which examples may be implemented.

With reference to FIG. 2 there is illustrated an exemplary architecture in which examples in accordance with the invention may be implemented. FIG. 2 illustrates an example architecture comprising a user device 12, an application server 14, a reservation server 16, and a content server 18.

The user device comprises a display 12, a processor 24, a memory 24, and an interface 26, all interconnected via a user device communication bus 27. The application server comprises a comparator 28, a processor 30, a memory 32, an interface 40, an interface 34, and an interface 36, all interconnected via an application server communication bus.

The user device 12 and the application server 14 communicate with each other on communication lines 38 which are established between the user device interface and the application server interface 40. The communication lines 38 may represent a communication established through the Internet. In general a communication between the user device 12 and the application server 14 is established via a network.

The application server 14 communicates with the reservations server 16 via the application server interface 34. The application server 14 communicates with the content server 18 via the application server interface 16.

Figure 3A:
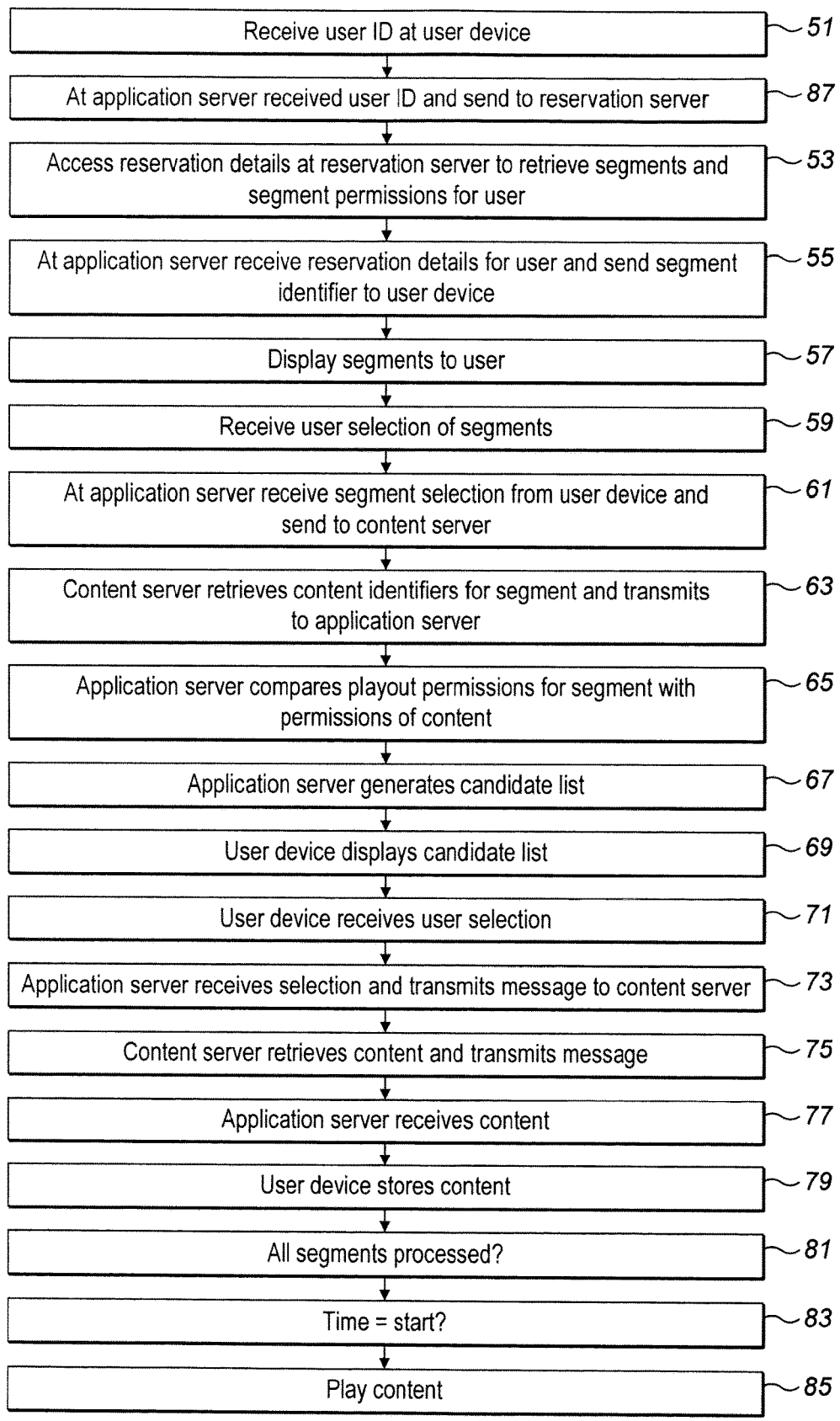
FIGS. 3a and 3b illustrate a first example scenario.
Figure 3B:
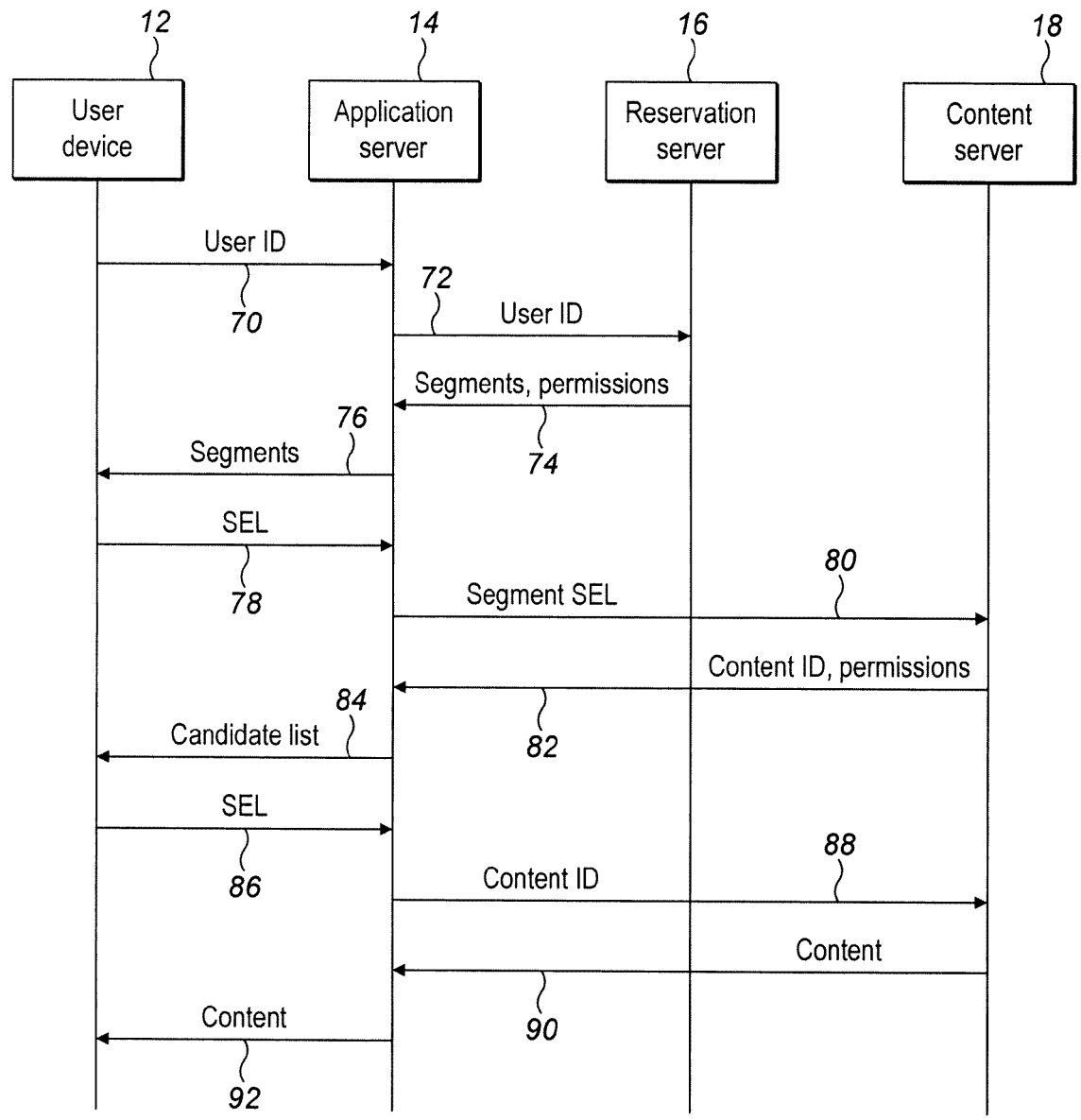

A first example scenario is now described with reference to FIGS. 3a and 3b. FIG. 3b illustrates the signalling between the elements of the architecture of FIG. 2. FIG. 3b shows blocks which represent the elements of FIG. 2: the user device 12, the application server 14, the reservation server 16, and the content server 18.

The APP associated with the described service has been downloaded and installed on the user device 12, and the APP is running on the user device 12 such that a graphical user interface (GUI) associated with the APP is currently displayed on the display 20 of the user device 12.

As denoted by step 51, the user device 12 receives a user identifier (ID) at the GUI displayed on the display 20. The GUI is suitably adapted to request the user of the user device to enter user ID information. The user ID information will be implementation specific, and its format will be implementation specific.

The user ID information may not be information that specifically identifies the user, but rather is information which allows a unique identification to be made. Thus the term user ID can be understood as being an ID (identifier) entered by a user, but not necessarily an ID (identifier) which identifies the actual user.

Once the user ID information is entered at the APP, the user device constructs a message and transmits the message including the user ID information to the application server 14. This is denoted by message 70 in FIG. 3b.

On receipt of the message 70, as denoted by step 87 the application server 14 transmits a message 72 to the reservation server 16 which similarly contains the user ID information.

As denoted by step 53 the reservation server utilises the user ID information to access reservation details associated with the user. The reservation details identify any segments associated with the user, and any permissions associated with such segments.

A segment is an identifiable portion with which the user is associated. For any user, the reservation server may define a plurality of identifiable segments. For each segment the user permissions may be different. For example, the user permissions may be time based, with a segment being associated with a start time and a finish time. Where a user is associated with a plurality of segments, each segment has different start and finish times, such that its permissions are different. Thus for each user there may be provided a plurality of segments, and for each segment there may be permissions comprising, for example, a start time and a finish time. The start time and the finish time define a playout window for the segment.

The reservation server 16 then transmits a message 74 to the application server 14, which message identifies the segments and the associated permissions for each segment.

In step 55 the application server retrieves the segments from the message 74, and transmits a message 76 to the user device which identifies the segments available for the user.

In step 57 the user device displays the segments on the display 20 of the user device 12, and then in step 59 the user device 12 receives selection of one segment by the user at the display 20.

The user device 12 then transmits a message 78 to the application server 14, which denotes the selection made by the user, i.e. the segment selected.

In a step 61 the application server then selects the segment based on the message 78, and transmits a message to the content server 18 identifying the selected segment.

In a step 63 the content server 18 retrieves the content identifiers (IDs) for the segment, and then in a message 82 returns the content IDs to the application server 14. In addition to the content ID, the content server returns any permissions associated with the content, such as the time window for which the associated content is valid.

In a step 65 the comparator 28 of the application server 14 compares the permissions of the user for the segment (retrieved from the reservations server) with the permissions of the content. This may comprise comparing the playout time associated with the segment with the availability time of the content returned from the content server.

In step 67 a content candidate list for the segment is then created in dependence on the comparison, which includes the identification of that content for which there is an overlapping playout window and valid content time window.

The selection of content may be based on the content being permitted for the whole playout window. Alternatively the selection of content may be based on the content being permitted for part of the playout window, with the provision of the content being limited within the playout window.

The application server then transmits a message 84 to the user device, which comprises the content IDs candidate list.

The user device 12 then displays the candidate list on the display 20 in a step 69, and in a step 71 identifies the selected candidate contents, selected by the user.

The user display causes the candidate content to be displayed. This may be displayed in a number of ways. For example the user devices may display a simple list to the user. The user devices may display the candidate content together with a sample as to the content, which sample may be enabled by selected that candidate content. For example this may be a trailer of a movie.

The user may select content from the list. In an example, the user may be able to select five content items.

The user device 12 then transmits a message 86 to the application server 14 denoting the selections made by the user.

In a step 73 the application server 14 then retrieves the selected content IDs in the message 86 for the segment, and transmits a message 88 to the content server which includes the selected content IDs.

In a step 75 the content server 18 retrieves the content associated with the selected content IDs, and transmits a message 90 to the applications server 14 which includes the content associated with the selected content IDs.

In a step 77 the application server 14 stores the content in its memory 32. The application server 14 then transmits a message 92 to the user device 12, which comprises the content associated with the selected content IDs.

The user device 12 stores the content in the memory 24, being the local memory of the user device, as denoted by step 79.

In a step 81 it is determined whether all segments associated with the user, based on the information retrieved from the reservations server, have been processed. If not, then step 56 is returned to and the following steps repeated for the next segment. These steps can be repeated for each segment.

If in step 81 it is determined that no further segments are to be processed, then in step 83 it is determined whether a start time has been reached. A start time may be a start time associated with the segment permissions for a user.

If a start time has been reached, then in step 85 the user device is enabled to play the content associated with the segment.

A second example scenario is now described with reference to FIGS. 4a and 4b. Where elements of FIGS. 4a and 4b correspond to elements of FIGS. 3a and 3b, like reference numerals are used.

Figure 4A:
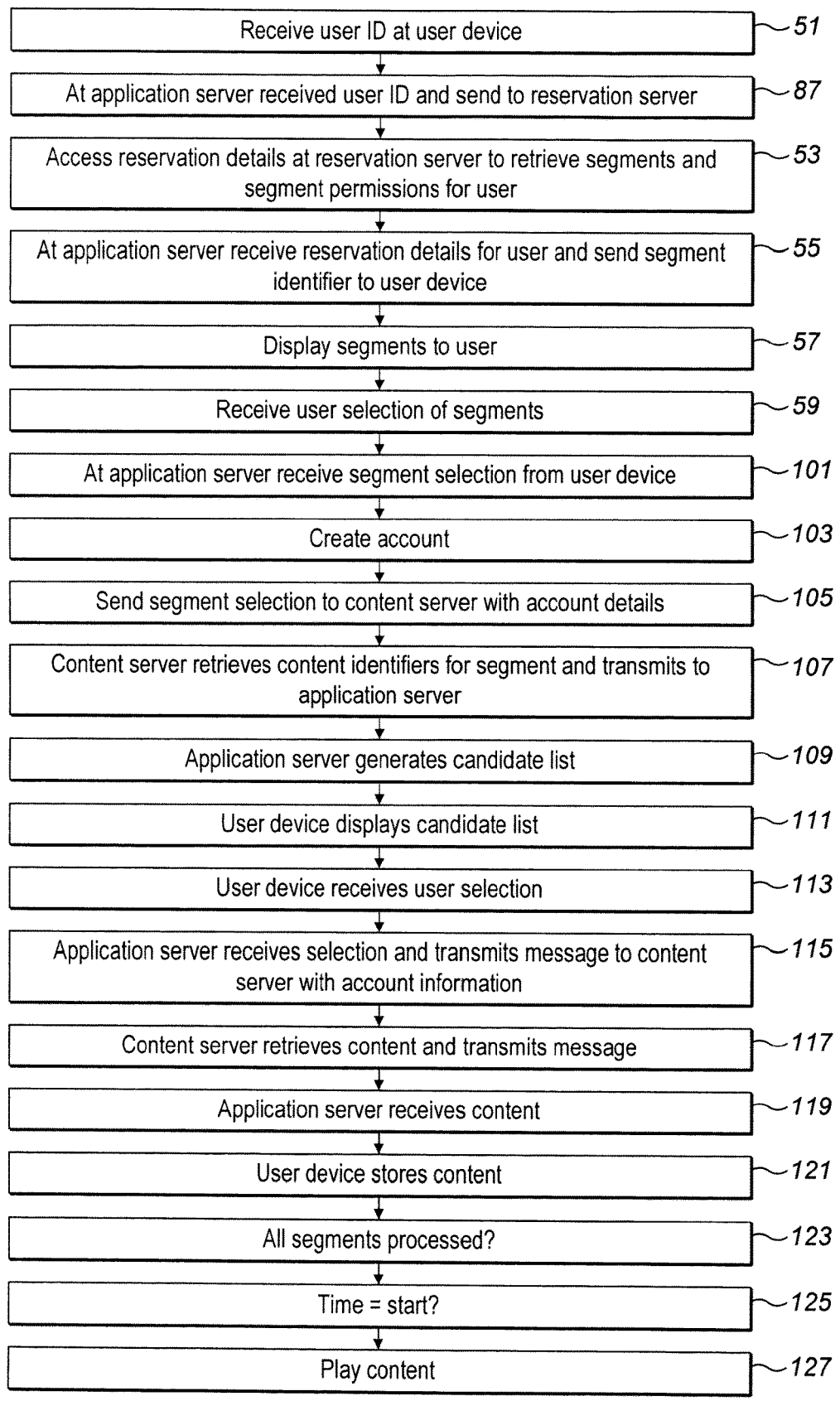
FIGS. 4a and 4b illustrate a second example scenario.
Figure 4B:
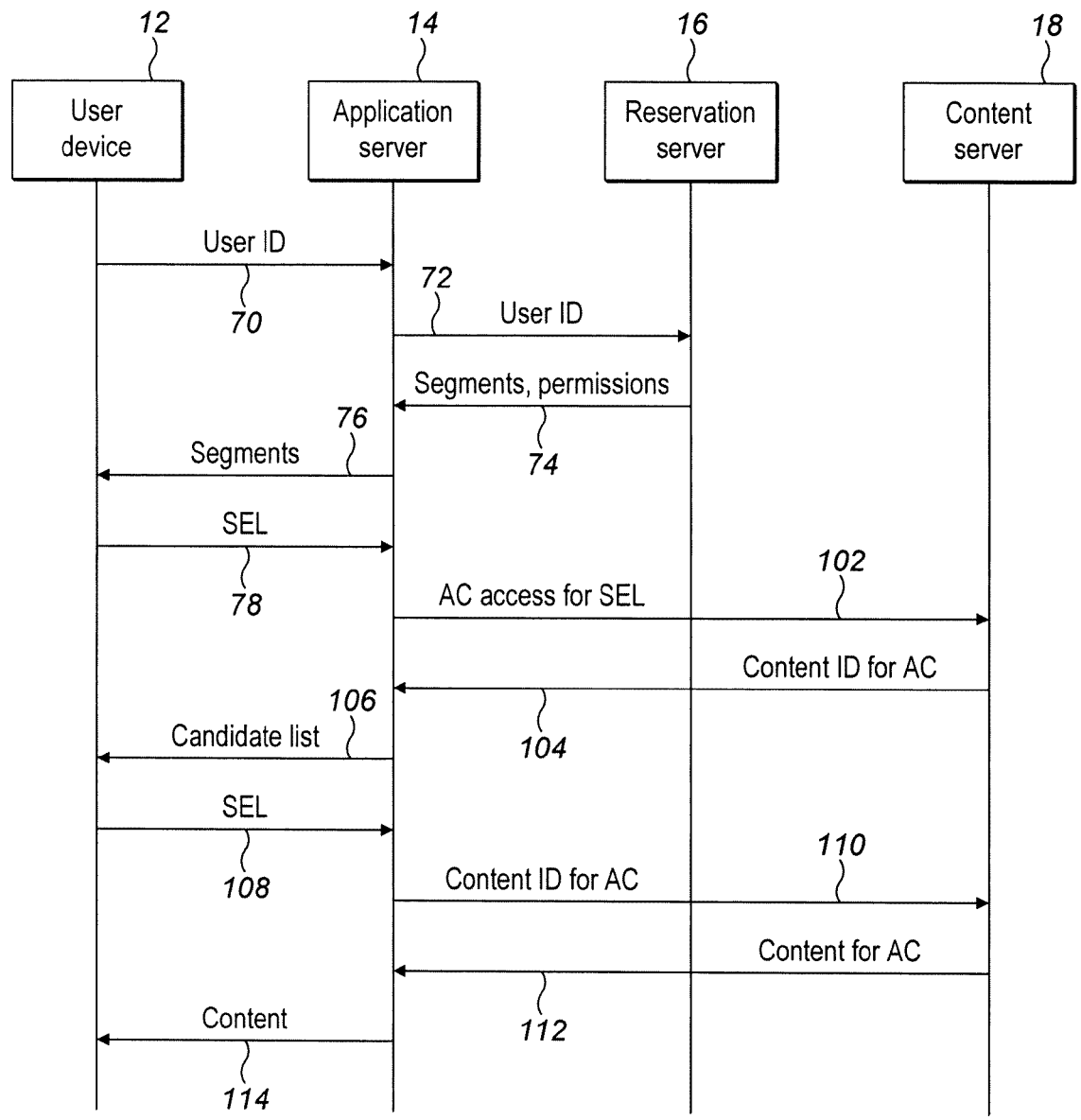

FIGS. 4a and 4b illustrate the signalling between the elements of the architecture of FIG. 2. FIGS. 4a and 4b shows blocks which represent the elements of FIG. 1: the user device 12, the application server 14, the reservation server 16, and the content server 18.

The APP associated with the described service has been downloaded and installed on the user device 12, and the APP is running on the user device 12 such that a graphical user interface (GUI) associated with the APP is currently displayed on the display 20 of the user device 12.

As denoted by step 51, the user device 12 receives a user identifier (ID) at the GUI displayed on the display 20. The GUI is suitably adapted to request the user of the user device to enter user ID information. The user ID information will be implementation specific, and its format will be implementation specific.

Once the user ID information is entered at the APP, the user device constructs a message and transmits the message including the user ID information to the application server 14. This is denoted by message 70 in FIG. 4a.

On receipt of the message 70, as denoted by step 87 the application server 14 transmits a message 72 to the reservation server 16 which similarly contains the user ID information.

As denoted by step 53 the reservation server utilises the user ID information to access reservation details associated with the user. The reservation details identify any segments associated with the user, and any permissions associated with such segments.

The reservation server 16 then transmits a message 74 to the application server 14, which message identifies the segments and the associated permissions for each segment.

In step 55 the application server retrieves the segments from the message 74, and transmits a message 76 to the user device which identifies the segments available for the user.

In step 57 the user device displays the segments on the display 20 of the user device 12, and then in step 59 the user device 12 receives selection of one segment by the user at the display 20.

The user device 12 then transmits a message 78 to the application server 14, which denotes the selection made by the user, i.e. the segment selected.

In a step 101 the application server then selects the segment based on the message 78.

As denoted by step 103, an account is then created for the segment. The creation of the account need not be after selection of the segment. In an alternative, for example, the accounts are created when the reservations (or bookings) are first accessed. Then, when the segment is selected, the account created for that segment is accessed (without the user's knowledge)

The account is created using the user ID provided in the process. The generation of this account is not visible to the user device 12 or the user associated with the user device 12.

As denoted by step 105, the application server then transmits a message 102 to the content server 18 including the account information.

In a step 107 the content server is accessed using the account information for the segment, and the content identifiers (IDs) for the segment are accessed at the content server. Then in a message 104 the content IDs are returned to the application server 14. In addition to the content ID, the content server returns any permissions associated with the content.

In a step 109 a content candidate list for the segment is then created, which includes the identification of that content retrieved from the content server. The application server then transmits a message 106 to the user device, which comprises the content ID candidate list.

The user device 12 then displays the candidate list on the display 20 in a step 111, and in a step 113 identifies the selected candidate contents, selected by the user. The user device 12 then transmits a message 108 to the application server 14 denoting the selections made by the user.

In a step 115 the application server 14 then retrieves the selected content IDs in the message 86 for the segment, and transmits a message 110 to the content server 18 which includes the selected content IDs. This message also includes the account information for the segment, to allow access to the content.

In a step 117 the content server 18 retrieves the content associated with the selected content IDs, and transmits a message 112 to the application server 14 which includes the content associated with the selected content IDs.

In a step 119 the application server 14 stores the content in its memory 32. The application server 14 then transmits a message 114 to the user device 12, which comprises the content associated with the selected content IDs.

The user device 12 stores the content in the memory 24, being the local memory of the user device, as denoted by step 121.

In a step 123 it is determined whether all segments associated with the user, based on the information retrieved from the reservations server, have been processed. If not, then step 57 is returned to and the following steps repeated for the next segment. These steps can be repeated for each segment.

If in step 123 it is determined that no further segments are to be processed, then in step 125 it is determined whether a start time has been reached. A start time may be a start time associated with the segment permissions for a user.

If a start time has been reached, then in step 127 the user device is enabled to play the content associated with the segment.

In this second example the provision of content to a user is thus dependent upon the creation of a temporary access account for the user device within the playout window. This temporary access account is created without alerting the user of the user device. The temporary access account is created without notifying the user device. The temporary access account is created by the server in communication with a service provider, and automatically used by the server without any communication with the user device. The creation of the access account, and the use of the access account, is based on communication between the server and the content provider associated with the access account.

The created temporary account may be cancelled by the application server once the content from the content server has been accessed and provided to the user device, and/or after the time period associated with the reservation period for the segment has expired.

The system may modify, remove, or create accounts in the case that the reservation period changes. The reservation period may change, for example, because it is associated with a travel booking, and the booking may change. For example, in the example of the reservation period being associated with a flight booking, if the scheduled flight time changes, then the playout window of any downloaded content may be updated. If ne passengers or segments are added, then additional accounts may be created for them (without the user knowing).

A third example scenario is now described with reference to FIGS. 4a and 4b. Where elements of FIGS. 5a and 5b correspond to elements of FIGS. 3a and 3b or FIGS. 4a and 4b, like reference numerals are used.

Figure 5A:
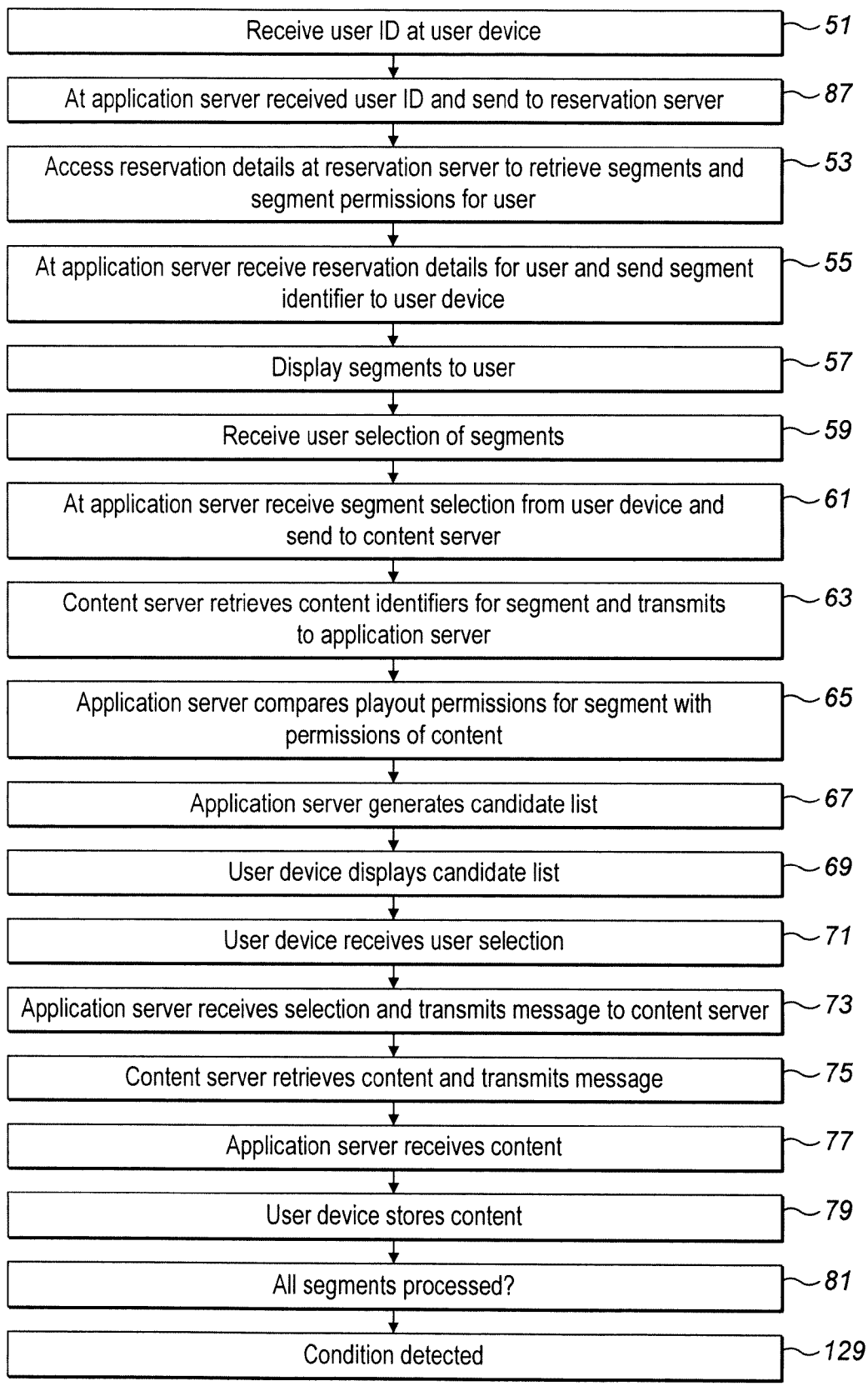
FIGS. 5a and 5b illustrate a third example scenario.
Figure 5B:
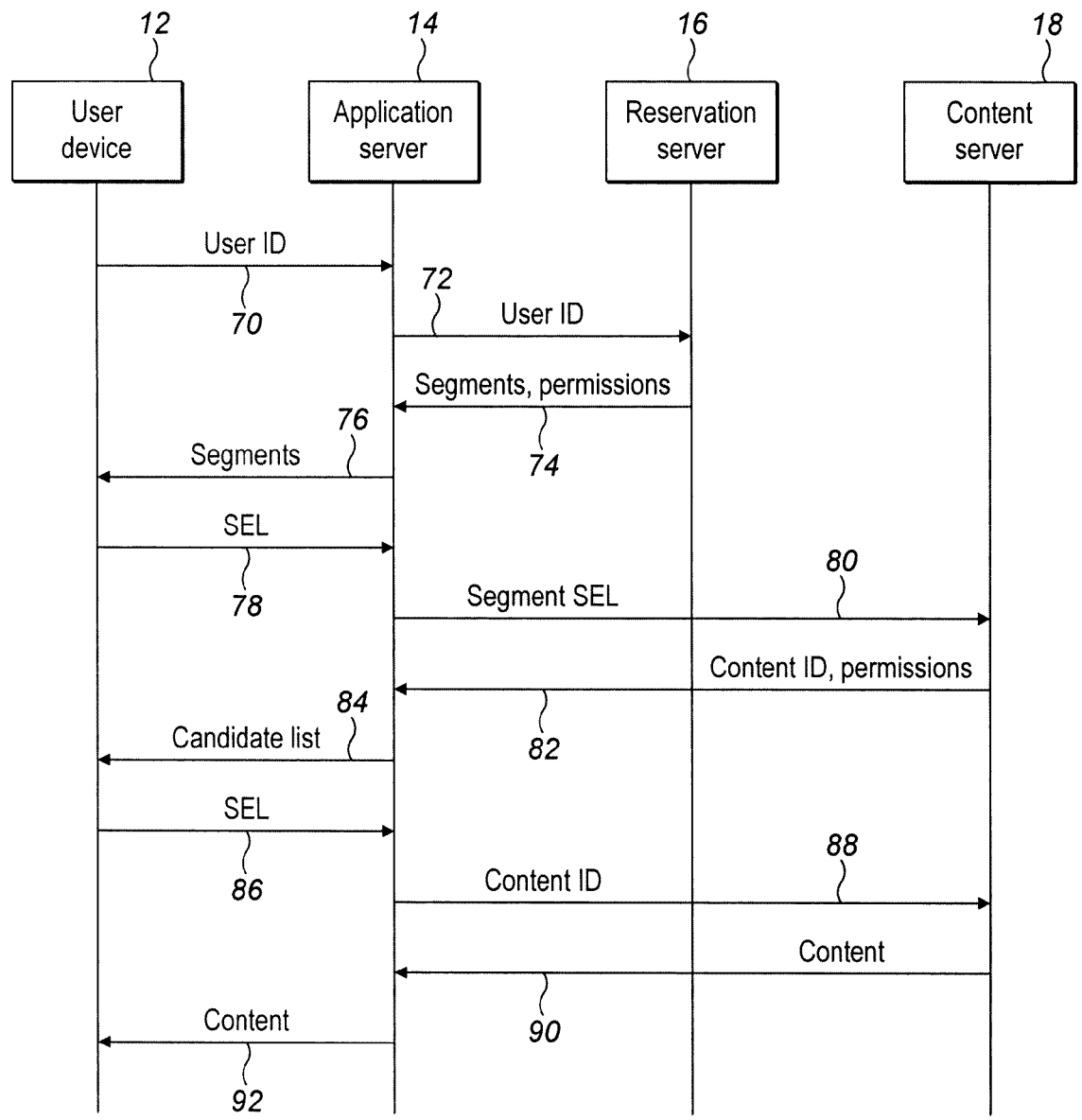

FIGS. 5a and 5b illustrate the signalling between the elements of the architecture of FIG. 2. FIGS. 5a and 5b show blocks which represent the elements of FIG. 2: the user device 12, the application server 14, the reservation server 16, and the content server 18.

The APP associated with the described service has been downloaded and installed on the user device 12, and the APP is running on the user device 12 such that a graphical user interface (GUI) associated with the APP is currently displayed on the display 20 of the user device 12.

As denoted by step 51, the user device 12 receives a user identifier (ID) at the GUI displayed on the display 20. The GUI is suitably adapted to request the user of the user device to enter user ID information. The user ID information will be implementation specific, and its format will be implementation specific.

Once the user ID information is entered at the APP, the user device constructs a message and transmits the message including the user ID information to the application server 14. This is denoted by message 70 in FIG. 2.

On receipt of the message 70, as denoted by step 87 the application server 14 transmits a message 72 to the reservation server 16 which similarly contains the user ID information.

As denoted by step 53 the reservation server utilises the user ID information to access reservation details associated with the user. The reservation details identify any segments associated with the user, and any permissions associated with such segments.

The reservation server 16 then transmits a message 74 to the application server 14, which message identifies the segments and the associated permissions for each segment.

In step 55 the application server retrieves the segments from the message 74, and transmits a message 76 to the user device which identifies the segments available for the user.

In step 57 the user device displays the segments on the display 20 of the user device 12, and then in step 59 the user device 12 receives selection of one segment by the user at the display 20.

The user device 12 then transmits a message 78 to the application server 14, which denotes the selection made by the user, i.e. the segment selected.

In a step 61 the application server then selects the segment based on the message 78, and transmits a message to the content server 18 identifying the selected segment.

In a step 63 the content server 18 retrieves the content identifiers (IDs) for the segment, and then in a message 82 return the content IDs to the application server 14. In addition to the content ID, the content server returns any permissions associated with the content, such as the time window for which the associated content is valid.

In a step 65 the comparator 28 of the application server 14 compares the permissions of the user for the segment (retrieved from the reservations server) with the permissions of the content. This may comprises comparing the playout time associated with the segment with the availability time of the content returned from the content server.

In step 67 a content candidate list for the segment is then created in dependent on the comparison, which includes the identification of that content for which there is an overlapping playout window and valid content time window. The application server then transmits a message 84 to the user device, which comprises the contents IDs candidate list.

The user device 12 then displays the candidate list on the display 20 in a step 69, and in a step 71 identifies the selected candidate contents, selected by the user. The user device 12 then transmits a message 86 to the application server 14 denoting the selections made by the user.

In a step 73 the application server 14 then retrieves the selected content IDs in the message 86 for the segment, and transmits a message 88 to the content server which includes the selected content IDs.

In a step 75 the content server 18 retrieves the content associated with the selected content IDs, and transmits a message 90 to the applications server 14 which includes the content associated with the selected content IDs.

In a step 77 the application server 14 stores the content in its memory 32. The application server 14 then transmits a message 92 to the user device 12, which comprises the content associated with the selected content IDs.

The user device 12 stores the content in the memory 24, being the local memory of the user device, as denoted by step 79.

In a step 81 it is determined whether all segments associated with the user, based on the information retrieved from the reservations server, have been processed. If not, then step 56 is returned to and the following steps repeated for the next segment. These steps can be repeated for each segment.

If in step 81 it is determined that no further segments are to be processed, then in step 83 it is determined whether a start condition has been achieved.

A start condition can be that a particular time has been reached, or that an elapsed time has expired.

In addition, or in the alternative, the start condition can be detection of another condition. For example, where a reservation period segment is associated with a flight, then a condition may be detected such as speed of movement of the user devices being in excess of a certain threshold (e.g. in excess of 300 km/hr), or the user device being detected at being at a certain altitude (e.g. 1000 m). Detection of such an event can be a trigger for allowing content to be accessed on the user device.

Alternatively or in addition, there may be provided a communication device within a transmissions distance of the user device, which can transmit a beacon signal to the user device to allow the content to be accessed. For example on a flight, equipment may be provided on an aircraft to transmit a beacon signal to the user device. The beacon signal may be transmitted by a short range communication such as Bluetooth.

In the foregoing three example scenarios have been described: a first example in which a playout time period associated with a reservation booking is compared to an authorised time period of content; a second example in which a user account is created without visibility to the user to enable content to be accessed, and a third example in which initiation of access to content is triggered other than by time. Aspects of all examples may be combined, and no example is limited to the specifics of the example as set out.

An example implementation is where the reservation period relates to a flight booking having outward and return legs. The outward and return legs comprises separate segments for the user. The reservations server 16 may be a booking server associated with the flight booking. The user ID provided to the APP may be a PNR (passenger name record) and passenger name, which is used by the application server 14 to access the booking server and retrieve the segments for the user, being the outward and return flight legs.

Based on the information provided by the user, the server is able to identify the playout window for the user for each segment. The playout window for each segment has a beginning time and an end time. The beginning time and the end time may correspond to the beginning and end times of a qualifying period, such as of a flight. The begin time may start a certain amount of time before or after the start of the qualifying period, or be exactly coincident with it. The end time may finish a certain amount of time before or after the end of the qualifying period, or be exactly coincident with it. The playout window is the time window during which content can be played by the user.

The content server has access to content which may be provided to the user. The content may be associated with the purpose for which the APP is being used, for example the content may be associated with an airline which is providing the flight for the user. The content is associated with permitted use windows, i.e. windows of time within which the content may be accessed. The permitted use window may be associated with an airline, may be associated with the geographical departure or arrival points of a flight etc.

The application server compiles the user selections, and appends each set of content with information which identifies the time duration for which the content is active, by marking each piece of content accordingly. Thus each piece of content may be enabled with a time duration which corresponds to the beginning and end data times.

The application server transmits the content to the user device marked with the appended control information.

The content is then stored on the user device, together with the start and end times.

The user device may run a countdown a clock, which indicates the countdown until the content is enabled. On expiry of the countdown clock, a 'play' button may appear on the screen of the user device to indicate that the content is not available to the user.

In general the content is any digital information which may be stored on the user device. The content may be audio information or video information. The content may comprise books or magazines.

The examples described are where a user accesses the content to create the content to be accessed offline using one device, and then that same device is used for the off-line access. Variations to this are possible. For example a user may create the content to be accessed off line using one device, and then the content may be actually accessed offline using another device.

In this way, a user can create content to be accessed using a device such as a computer, but then the content is accessible using a tablet. In this way a user can create content to be accessed on a device associated with a different user. For example a parent can create a content for access by a tablet associated with a child.

A device is a user device in the sense that it is utilised by a specific user at least at a specific point in time. A device may be generally provided, such as a television in a hospital room, but for a given period of time that television can be associated with a particular user. For the duration of that user's stay in hospital, for example, the television becomes a device which is specific to a user, and can thus be considered a user device.

In the above reference has been made to an example of the identifier being associated with a flight reservation or booking. In general, the invention relates to the accessing of content based on a future condition in a controlled environment or a controlled journey, a flight being an example of a controlled journey. A characteristic is that the rights associated with access to the content are inspected in dependence on the future condition.

In the example of a flight, the content may be downloaded to a user device and then accessible on the user device during the flight in dependence on a future condition being met. The future condition may be the time of the flight, or the future condition may be the receipt of a signal via a Wi-Fi network or a beacon transmission provided on the aircraft during the flight.

Where the future condition is time-related, a current time may be compared with a time window, and the content enabled if the current time coincides with the time window. When the technique is associated with a flight (or other pre-arranged journey), the time window may coincide with the start/end times of the flight, or with a predetermined period before and after the flight.

Where the aircraft is provided with a Wi-Fi network, the content may not be downloaded to the user device in advance, but may be downloaded to the user device when the user device connects to the Wi-Fi network on the aircraft. A server may be provided on the aircraft which stores the content, and the content is then delivered via the Wi-Fi network on the aircraft to the user device. In such an example the Wi-Fi network may be a closed network, with no access to the Internet.

Where the content is not downloaded to the user device in advance of the flight, but is downloaded via a network on the aircraft, then the information provided by the user device in establishing a content list in advance of the flight, may be used in order to determine what content should be provided on the server connected to the network on the flight. This takes advantage of the fact that the users list of content is selected in advance of the flight, and then in dependence on a future condition being met, such as the user device connecting to the Wi-Fi on the aircraft, the content is downloaded from a server connected to that Wi-Fi. This will allow the operator of that Wi-Fi network or server to provide only the content which is desired by users on the server. As noted above, the future condition can be determined based on the speed or altitude of the user device. Thus the device can itself determine the future condition (based on the time which the device detects, or the device detecting a speed or attitude), or the device may receive a notification (such as a Wi-Fi signal or beacon signal). The device may also receive a notification by some other means when used in an in-flight scenario, such as as a result of scanning of a boarding card, or scanning of a QR code.

Thus the content can be accessed based on determination of a future event being met, and also in dependence on determination of the future event being met in combination with another condition being met. This may, for example, be that the future event to be detected comprises identifying a time window, and also identifying that within that time window the user device is located in a specific environment, and thus for example receives a beacon or Wi-Fi signal on an aircraft.

Note that the transmission of a beacon signal may be via Bluetooth.

Whilst specific examples are discussed herein based on the use of the invention with a flight, the invention is not limited to being used in conjunction with a flight. Other journey types may be used with the invention. For example other journey types are boat (ferry) journeys, train journeys, or car journeys.

In the example of any journey type, such as a car journey type, on providing the identifier when the user accesses the application on the user device, a network connectivity map for the journey may be accessed. This may be particularly associated with a car journey. Based on the network connectivity map, which may be retrieved from the identifier server 108 based on the unique identifier provided by the user. On retrieving the connectivity map, the application can identify periods of the journey for which connectivity is expected to be limited, such that streaming of content will not be possible. For these periods of the journey at least, the invention can be used in order to select content and download content in advance.

It should be noted that in general connectivity may be limited not only by streaming of data not being technically possible, but also by the streaming of data being prohibitively expensive.

In general, the access to contents provided may not be just access to a content item, but may also be to control access to levels of the content. For example if the content is a game, then the permissions associated with content may be to access different levels or features of the game. Dependent upon the rights restrictions associated with the content, at the time of the future condition different aspects of the content may be enabled.

Reference is made herein to content being enabled or selectively enabled. Content is enabled when conditions— more specifically the rights conditions—associated with the content permissions are met. Permission is granted when the condition or conditions is/are met. The expression selectively enabled refers to the fact that such permissions are only selectively met, for example with a time window. Whilst examples of the present invention are particularly associated with rights permissions, and in such case the expression "selectively enabling" is interchangeable with "selectively permitting", in some examples the enablement of the content may allow something to be done with the content other than permitting access to it, which is generally the purpose of rights permissions.

The invention has been described by way of reference to particular examples, but is not limited to the details of any examples. Any described examples may be combined, and in combining parts of the whole of examples may be combined.

The invention claimed is:

1. A method of establishing access to content at a user device, the method comprising the steps, at the user device, of:
    providing an identifier, the identifier linked to a future condition;
    accessing a catalogue of available content based on the identifier;
    receiving a list of content identifiers from the catalogue, wherein the list comprises content identifiers of content which meet the future condition;
    selecting at least one content identifier from the catalogue;
    downloading content associated with the at least one selected content identifier to the user device;
    preventing access to the downloaded content at the user device, prior to the occurrence of the future condition:
    responsive to detecting a condition corresponding to the future condition, and an indication that the user device is located in a controlled environment, triggering access at the user device to the downloaded content associated with the at least one content identifier, wherein:
    the controlled environment limits communications with the user device;
    the future condition comprises at least one of an association with a time window, a condition of the state of the user device, and a condition for the rights to access the downloaded content; and
    the triggering further comprises matching the future condition as indicated by the identifier to a current condition as recognized by the user device; and
    maintaining access at the user device to the downloaded content in dependence on the condition being maintained, wherein if the condition corresponding to the future condition is no longer met at the user device, access to the downloaded content is prevented at the user device.

2. The method of claim 1, further comprising:
    triggering access to the content in dependence on a time window.

3. The method of claim 2, wherein the time window is associated with a further condition being a rights condition, and the step of triggering access to the content is dependent on matching a current time to a time window of the rights condition.

4. The method of claim 1, wherein detecting the condition corresponding to the future condition comprises one or more of: detecting the altitude of the user device; detecting the speed of the user device; and detecting connection of the user device to a specific network.

5. The method of claim 1, wherein the step of triggering access at the user device to the downloaded content comprises one of triggering access at the user device to the downloaded content and triggering access at a further user device to the downloaded content.

6. The method of claim 1, wherein the condition is a rights condition for the content, wherein the step of triggering further comprises matching the rights condition to a current condition to allow rights permitted access to the content.

7. The method of claim 1, wherein a current condition is determined from one of a state of the user device and a state of a further user device.

8. The method of claim 1 in which the controlled environment is defined by a controlled journey.

9. The method of claim 1, wherein the content is video content, and the step of triggering access further comprises selectively allowing access to playout the video content.

10. A user device for establishing access to content, comprising: a user interface configured to:
- receive an identifier from a user of the user device, the identifier being linked to a future condition;
- access a catalogue of available content based on the identifier;
- receive a list of content identifiers from the catalogue, wherein the list comprises content identifiers of content which meet the future condition;
- select at least one content identifier from the catalogue; and
- download content associated with the at least one selected content identifier to the user device; and a processor configured to:
- prevent access to the downloaded content at the user device, prior to the occurrence of the future condition:
- detect a condition corresponding to the future condition and an indication that the user device is located in a controlled environment, and trigger access at the user device to the downloaded content associated with the at least one selected content identifier, wherein:
  - the controlled environment limits communications with the user device;
  - the future condition comprises at least one of an association with a time window, a condition of the state of the user device, and a condition for the rights to access the downloaded content; and
  - the triggering further comprises matching the future condition as indicated by the identifier to a current condition as recognized by the user device; and
  - maintain access at the user device to the downloaded content in dependence on the condition being maintained, wherein if the condition corresponding to the future condition is no longer met at the user device, the processor is configured to prevent access to the downloaded content at the user device.

11. The user device of claim 10, wherein the processor is further configured to detect one or more of: the altitude of the user device; the speed of the user device; and connection of the user device to a specific network.

12. The user device of claim 10, wherein the condition is a rights condition for the content, the user device further being configured to trigger access in dependence on matching the rights condition to a current condition to allow rights permitted access to the content.

13. The user device of claim 10, further configured to trigger access to the content in dependence on a time window, wherein the time window is associated with a further condition being a rights condition, and the user device is configured to selectively enable the content in dependence on matching a current time to a time window of the rights condition.

14. The user device of claim 10 in which the controlled environment is defined by a controlled journey.

* * * * *